Patented July 27, 1954

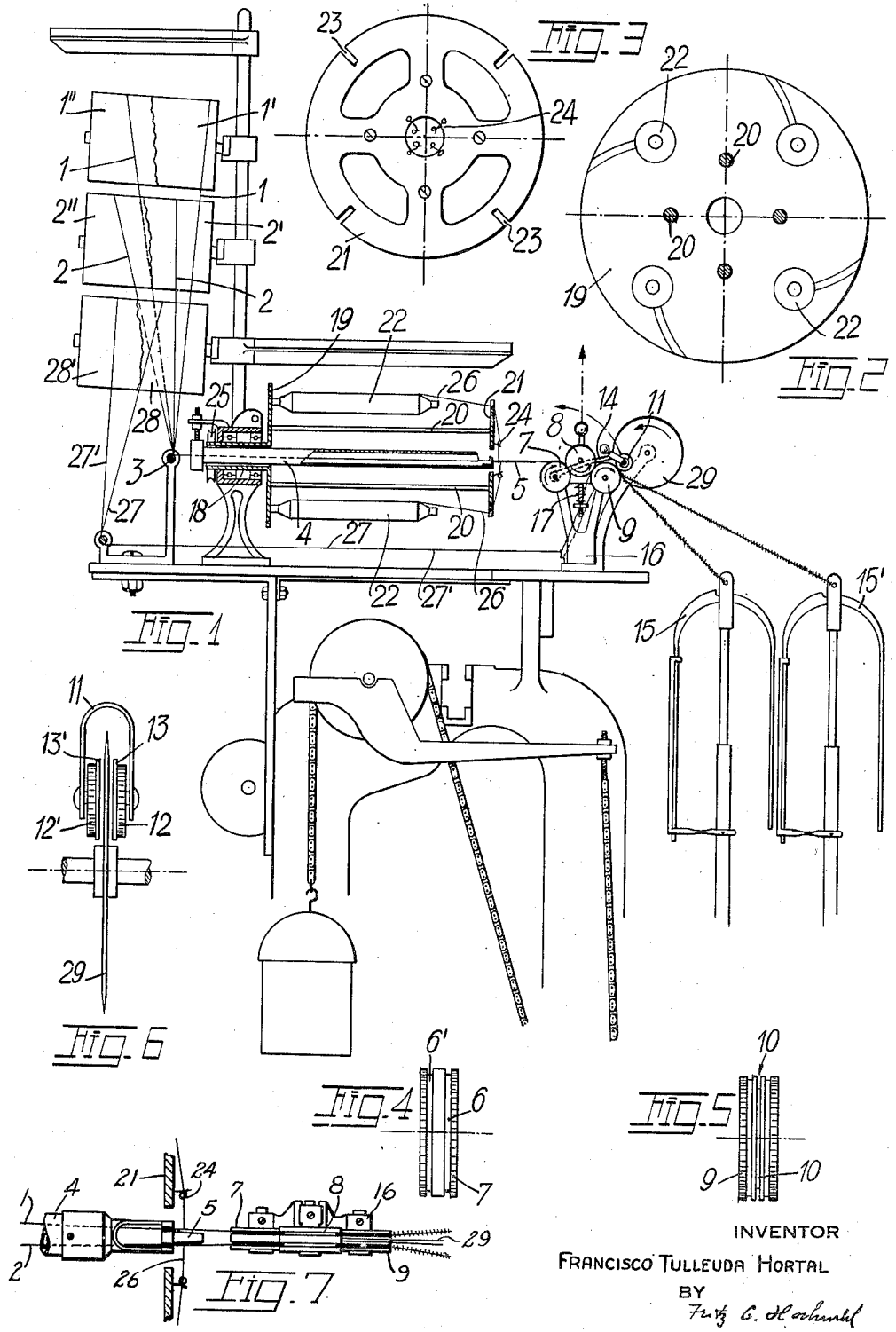

2,684,565

UNITED STATES PATENT OFFICE 2,684,565

DEVICE FOR THE PRODUCTION OF FLUFFY THREADS

Francisco Tulleuda Hortal, Sabadell (Barcelona), Spain

Application February 24, 1951, Serial No. 212,638

Claims priority, application Spain March 2, 1950

2 Claims. (Cl. 57—24)

The present invention relates to a device for the production of fluffy threads, which device, substituting the current feeding apparatus of flyer spinning frames or continuous spinning machines, permits the production on a large scale of threads that are composed of at least two continuous yarns which hold between them short pieces of transverse threads closely spaced.

On the accompanying drawings is shown diagrammatically and by way of non-restrictive example one embodiment of the said device applied to a flyer spinning frame. In these drawings:

Fig. 1 is a diagrammatic view in side elevation;

Fig. 2 is a view showing the spindle bearing plate;

Fig. 3 is a view showing the thread guiding plate;

Figs. 4 and 5 are views of the guide rollers for the threads;

Fig. 6 is a view of the tension and cutting device; and

Fig. 7 is a top plan view of a portion of the apparatus including the guiding device for the continuous threads and the cutting device for the transverse threads.

Referring to Fig. 1, two principal continuous threads or two groups of principal continuous threads 1 and 2, coming from the respective feeding bobbins 1', 1'' and 2', 2'', after passing through a thread guide 3, are introduced into a tube or similar element 4, at the front end of which is mounted a tongue 5 that separates the said principal threads or groups of principal threads 1 and 2 and carries them by means of its side edges into the grooves 6, 6' (Fig. 4) of a guide roller 7. This guide roller 7 is mounted in such a way that the entering of the threads into their respective grooves is effected in exactly tangential direction, the space between the centers of the grooves 6, 6' being equal to the width of the tongue 5. Issuing from the guide roller 7, the threads or groups of threads 1 and 2 are guided by another roller 8, identical to the roller 7, to a further roller 9, which differs from the rollers 7 and 8 only in that it is provided in the center between its grooves with a circular continuous notch 10 (Fig. 5). On the roller 9, the threads or groups of threads 1 and 2 are submitted to the action of a tension device 11 (Fig. 6) which is composed of a framework and of two rollers 12, 12', which have respectively a rib 13, 13', each of which is introduced into the corresponding groove of the roller 9. This tension device is mounted upon an oscillating arm 14, actuated by a spring. After leaving the roller 9, the threads or groups of threads 1 and 2 are conducted to the respective flyers 15, 15'. All the rollers are provided with transversely fluted contact surfaces in order to assure the drawing of the threads.

The rollers 7 and 9 are mounted upon a fixed support 16 and the roller 8 is fitted in slide bearings which allow of its being moved in a vertical direction, and this roller is pressed against the rollers 7 and 9 by means of a spring 17.

On the rear end of the fixed tube 4 there is provided a revolving bushing 18 (Fig. 1) that bears a vertical plate 19 (Fig. 2) which in its turn is connected by means of rods 20 to another plate 21 (Fig. 3); the latter is arranged parallel to the plate 19 in the same plane as the front end of the tube 4, i. e. in the plane of the basis of the tongue 5 and the whole assembly receives a revolving movement through the pulley 25. On the said plate 19 there are mounted several cops 22, the bases of which are equidistant from the center of the plate. The number of the cops may vary and will depend on the desired results, and their threads, as they unwind from the cops, pass through suitable guides, e. g. radial slots 23 provided on the periphery of the revolving plate 21, and then to the respective thread guides 24 situated near the edge of the central hole of the plate 21. When the plates 19 and 21 and the elements that they support are revolving, the threads 26 of the cops are wound upon the tongue 5, leaving inside the helical coils the threads or groups of threads 1 and 2 that pass through the tube 4, the different elements being mounted in such a way that during the advance of the threads or groups of threads 1 and 2, the helical coils formed upon the tongue by the threads 26 are drawn away. The various thread guides 24 are differently spaced from the rotary head plate 21 in the longitudinal direction of the tongue 5 and adjustable within certain limits, so that the different threads to be wound are not in the same vertical plane and their circumvolutions on the tongue 5 are not superposed. Upon leaving the tongue 5, the threads or groups of threads 1 and 2 together with the helical coils of the threads 26, which surround them, are guided by the rollers 7, 8 and 9. But in the roller 9 there also enter two binding threads or two groups of binding threads 27 and 27', coming from their respective feeding bobbins 28 and 28', each of the said threads or groups of threads being directed to one of the two grooves of the roller 9, pressing the helical coils of the threads 26 between them and the threads or groups of threads 1 and 2 respectively that are enclosed by the coils.

Upon the advance of this combination of threads and helical coils of threads on the roller 9, the whole is maintained in tension by the tension device 11. The coils pass over the notch 10 and are there severed in their center by the rotary knife 29 entering said notch, thus leaving independent the threads or groups of threads 1 and 2 with the corresponding binding threads 27 and 27' and, at the same time, between the groups of threads 1, 27 and 2, 27' are held short pieces of transverse threads closely spaced that have been formed by the cutting of the helical coils that surrounded the principal threads 1 and 2.

After the helical coils have been cut, the groups of threads 1, 27 and 2, 27' with their respective short pieces of transverse threads that they hold, are, on leaving the roller 9, subjected to the twisting action of the flyers 15 and 15' respectively, whereby two fluffy threads are produced simultaneously.

The manner of mounting the spindles 22 on the plate 19 may be as desired and only by way of example there has been illustrated on Fig. 2 corresponding slots extending from the periphery of the plate. The manner in which the tube 4 or similar element is disposed may also vary in accordance with particular conveniences.

It will readily be understood that according to the revolving speed of the plates 19 and 21, the number of spindles disposed on the plate 19, the distance between the grooves 6, 6' of the rollers 7, 8 and 9, and the color and quality of the threads employed, fluffy threads of very diverse qualities and aspects may be obtained suitable for the manufacture of a great variety of fabrics.

It is to be noted that the device described may be subject to variation of detail, materials employed, manner of combining the different elements, without thereby departing from the principle of the invention.

What I claim is:

1. A device for the production of fluffy threads in connection with flyer spinning frames or continuous spinning machines, which comprises a thread guide, a stationary tongue, means for continuously feeding two inner foundation threads or strands through said thread guide to and along said tongue, a guide roller provided with two parallel circular grooves receiving tangentially said inner foundation threads or strands, the distance between the centers of said grooves being equal to the width of said tongue so as to guide one of said threads or strands along one side edge of said tongue and the other of said threads or strands along the other side edge of said tongue, a second grooved guide roller substantially identical to said first roller and receiving the threads or strands from said first guide roller, a third guide roller provided with two grooves receiving the threads or strands from said second guide roller, a peripheral notch between the grooves of said third guide roller, a plurality of revolving cops and thread guides feeding filler threads in spiral convolutions around said tongue to form a coil around said inner foundation threads or strands, said thread guides being spaced longitudinally of said tongue so as to prevent superposition of the spiral convolutions of said filler threads, means for feeding an outer foundation thread or strand into each groove of said third guide roller, a circular knife engaging the notch of said third guide roller for cutting the coils of the filler threads, and means for drawing off and twisting each of the two fluffy threads thus obtained.

2. In a device as defined in claim 1, a tensioning mechanism acting on the thread assembly passing over the third guide roller to facilitate the cutting of the coils, said tensioning mechanism comprising a pair of parallel spaced tension rollers enclosing the circular knife, each of said rollers being provided with a flange engaging a groove of the third guide roller, and means to press said tension rollers against said third guide roller.

References Cited in the file of this patent

UNITED STATES PATENTS

| Number | Name | Date |
|---|---|---|
| 1,687,932 | Kriegl | Oct. 16, 1928 |
| 1,927,292 | Neff et al. | Sept. 19, 1933 |

FOREIGN PATENTS

| Number | Country | Date |
|---|---|---|
| 493,507 | Germany | Mar. 7, 1930 |